(12) United States Patent
Janmey

(10) Patent No.: US 6,733,917 B1
(45) Date of Patent: May 11, 2004

(54) SEAL FOR PRESSURIZED CONTAINER WITH A RUPTURABLE SEAL

(75) Inventor: Robert M. Janmey, Columbia Township, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/385,862

(22) Filed: Mar. 11, 2003

(51) Int. Cl.[7] .................................................. H01M 2/12
(52) U.S. Cl. .......................................... 429/56; 222/189
(58) Field of Search ....................... 429/53, 56; 222/189

(56) References Cited

U.S. PATENT DOCUMENTS

| | | | | |
|---|---|---|---|---|
| 4,237,203 A | * | 12/1980 | Tsuchida et al. ............. | 429/122 |
| 5,165,578 A | * | 11/1992 | Laible ................... | 222/189.09 |
| 5,340,595 A | * | 8/1994 | Cameron-Price ............. | 426/112 |
| 5,976,728 A | * | 11/1999 | Yamamoto et al. ........... | 429/54 |
| 6,015,054 A | * | 1/2000 | King et al. .................. | 215/252 |
| 6,270,918 B1 | | 8/2001 | Wu ............................... | 429/56 |
| 6,270,919 B1 | | 8/2001 | Janmey ........................ | 429/56 |
| 6,312,850 B1 | | 11/2001 | Janmey ........................ | 429/174 |

* cited by examiner

Primary Examiner—Mark Ruthkosky
(74) Attorney, Agent, or Firm—Stewart A. Fraser

(57) ABSTRACT

A pressurized container with a vent assembly that reliably prevents resealing of a vented seal member is provided. In one embodiment, the vent assembly seals the end of a container that includes a first electrode, a second electrode, a separator located between the first and second electrodes and an electrolyte in contact with the electrodes and separator. The seal member includes at least two protrusions on the surface of the seal member. The protrusions define and maintain a gap between the cover and seal member after the seal member has ruptured thereby allowing pressure within the container to be reduced.

25 Claims, 5 Drawing Sheets

SEAL FOR PRESSURIZED CONTAINER WITH A RUPTURABLE SEAL

BACKGROUND OF THE INVENTION

This invention generally relates to ventable seals for pressurized containers and, more particularly, to ventable seals for hermetically sealed electrochemical cells.

Pressurized containers are used in a wide variety of applications. Some of these applications include: containers for aerosol sprays; storage containers for compressed gases typically used in industrial environments; and cylindrical batteries that contain electrochemically active materials that generate gas during a reaction between the chemicals. The batteries that millions of consumers purchase to power various devices inherently form a unique category of pressurized containers that must withstand high internal pressure and, at the same time, must contain a rupturable vent that will allow the gas to escape if the pressure becomes excessive. If a pressurized container does not contain a reliable rupturable vent and the pressure exceeds the container's burst strength, the container could rupture in an unpredictable and potentially harmful manner.

Electrochemical cells, such as cylindrical alkaline electrochemical cells, employ two electrochemically active materials and an aqueous electrolyte. The electrochemically active materials are typically manganese dioxide and zinc. These materials are conventionally housed in a cylindrical elongated container that is open on one end so that the electrochemically active materials and electrolyte can be inserted therein during the cell manufacturing process. A closure assembly that incorporates a disc shaped elastomeric seal member, a rigid inner cover and an elongated metallic current collector that projects through the center of the seal member, closes the open end of the container. The closure assembly is secured to the open end of the container by crimping the end of the container over the perimeter of the seal member. The seal member usually includes a hub, which surrounds the collector, and a thin diaphragm integrally molded into the central region of the seal body. The function of the diaphragm is to rupture and release gas from within the cell when the internal pressure becomes too high. The collector provides a conductive path between the zinc and one of the cell's terminal covers which is located on an end of the cell.

Manufacturers of electrochemical batteries constantly strive to improve the performance of their products in a wide variety of battery powered devices. A key objective of most battery manufacturers is to improve the amount of time that a battery will power a device. One strategy to accomplish this objective is to minimize the volume occupied by the cell's non-electrochemically active components, such as the cell's vent assembly, thereby leaving more volume within the cell available for the electrochemically active components. In recent years, vent assemblies have been made more volume efficient by redesigning them to require fewer components and yet operate more reliably than previously known vent assemblies. As the volume occupied by the vent assembly has decreased, the problem of a vented seal "resealing" against another component of the vent assembly has become more apparent. This problem is most common in primary batteries, also known as nonrechargeable batteries, if they are charged by other batteries. While most batteries are used in a conventional manner, a small percentage of batteries are exposed to an abusive condition such as when a primary battery is inadvertently placed in a device such that the battery's positive and negative terminals are reversed. This problem could occur, for example, in some commercially available flashlights that are powered by eight AA size alkaline batteries. Typically, the batteries are inserted into two elongated chambers containing four batteries each. According to the instructions that accompany the flashlight, the batteries must be inserted "in series," which means that the positive terminal of one battery contacts the negative terminal of an adjoining battery. Unfortunately, some consumers fail to comply with the instructions that are normally included with the device and accidentally insert one of the cells backwards. If this occurs with the second or third battery in a cavity containing four batteries, then the cell inserted backwards will be charged by one or more of the properly inserted cells when the light's switch is moved to the "on" position. Charging the battery that has been inserted backwards generates significant quantities of heat and gas within the battery. For example, the external temperature of the battery could exceed 65° C. The increase in temperature increases the pressure within the cell. In addition to increasing the temperature of the battery, the chemical reactions that take place during the charging of the cell generate gas that substantially increases pressure within the cell. The simultaneous production of gas and increase in temperature causes the elastomeric seal, which is typically made of nylon, to become soft and lose some of its structural rigidity. The thin ventable portion of the seal may become elongated due to both the heating of the nylon and the increase in internal pressure. Consequently, when the softened and distorted seal ruptures in response to the pressure buildup, an initial quantity of gas may escape from within the cell but the tear in the ruptured seal may be resealed when the softened ruptured seal contacts the smooth inner surface of the terminal cover and reseals against the terminal cover. This problem is particularly acute with low volume vent assemblies wherein the distance between the seal member and other components, such as the cell's cover, is very small. If the ruptured seal does reseal against the cover and the cell continues to generate gas, the cell may eventually experience a crimp release wherein the crimped connection between the seal and container is broken and the vent assembly is forcefully ejected from the container.

As disclosed in U.S. Pat. No. 6,270,919 B1, previous attempts to prevent resealing of a ruptured seal body have included modifying a seal's inner disc portion to include ribs. The ribs are designed to maintain the opening in a ruptured seal body thereby preventing resealing of the vent mechanism. However, while the inclusion of ribs in the seal's diaphragm is helpful in preventing resealing in most cells, some cells with the ribs incorporated therein may be deformed when exposed to the heat generated during charging such that the ribs cannot maintain the opening in the seal after it has ruptured.

In a seal embodiment disclosed in U.S. Pat. No. 6,312,850 B1, vertical grooves were placed in the surface of a compression member that forms a part of the seal assembly. The grooves are designed to prevent resealing of a vented seal's diaphragm. The grooves create channels that allow the gas to vent and thereby prevent resealing of the vented diaphragm. While this embodiment does prevent resealing of the diaphragm against the surface of the compression member, the grooves cannot prevent resealing of the torn diaphragm against the interior surface of the cell's terminal cover.

U.S. Pat. No. 6,270,918 B1 discloses a seal assembly that utilizes a seal member and an inner cover with openings incorporated therein. The seal member directly abuts the inner cover. An outer cover is secured to the seal assembly and forms a contact terminal of the cell. If the cell's pressure increases beyond an acceptable limit, the seal member ruptures thereby allowing gas to escape through the openings in both the inner cover and contact terminal. While the described seal assembly does safely vent an electrochemical cell, the seal assembly relies upon the use of the inner cover. Unfortunately, the inner cover occupies space within the cell that could be better used to store more of the cell's electrochemically active materials.

Therefore, there exist a need for an inexpensive and simple to manufacture vent assembly that occupies a minimum amount of volume within a pressurized container, such as an electrochemical cell, and can reliably prevent resealing of a vented seal.

BRIEF SUMMARY OF THE INVENTION

The present invention provides a pressurized container with a vent assembly that reliably prevents resealing of a vented seal member. The vent assembly occupies a minimum amount of space within the container and is inexpensive to produce.

In one embodiment, the present invention is a pressurized container. The container includes a wall that defines an opening through the wall. A vent assembly is secured to the container's wall and seals closed the opening. The assembly includes a rigid cover and a rupturable seal member. The cover defines a hole therethrough and is located within the opening in the wall. The seal member is flexible, disc-shaped, rupturable and overlays the opening in the container. The seal member has an annularly shaped, rupturable diaphragm region that is concentrically aligned with the opening. The diaphragm is located beneath the cover and between the seal member's perimeter, which contacts the container, and a centrally located tubularly shaped extension that projects from the seal member towards the cover. The extension and diaphragm region abut one another thereby forming a 360° interface. The diaphragm region has a top surface located on the side of the seal member closest to the cover. At least two protrusions are located on the diaphragm's top surface. The protrusions are located at a distance from the interface of the diaphragm and extension thereby insuring that an annular portion of the rupturable diaphragm located adjacent the extension remains unobstructed by the protrusions. The protrusions are positioned to contact the cover in response to a pressure buildup within the container causing the separation of the diaphragm from the extension about the 360° interface. After the seal member has ruptured, the protrusions define and maintain a gap between the diaphragm and cover. Pressure within the container is reduced as gas within the container escapes through the ruptured seal member, then through the gap between the seal member and cover, and then through the hole in the cover.

DETAILED DESCRIPTION OF THE INVENTION

Figure 1:
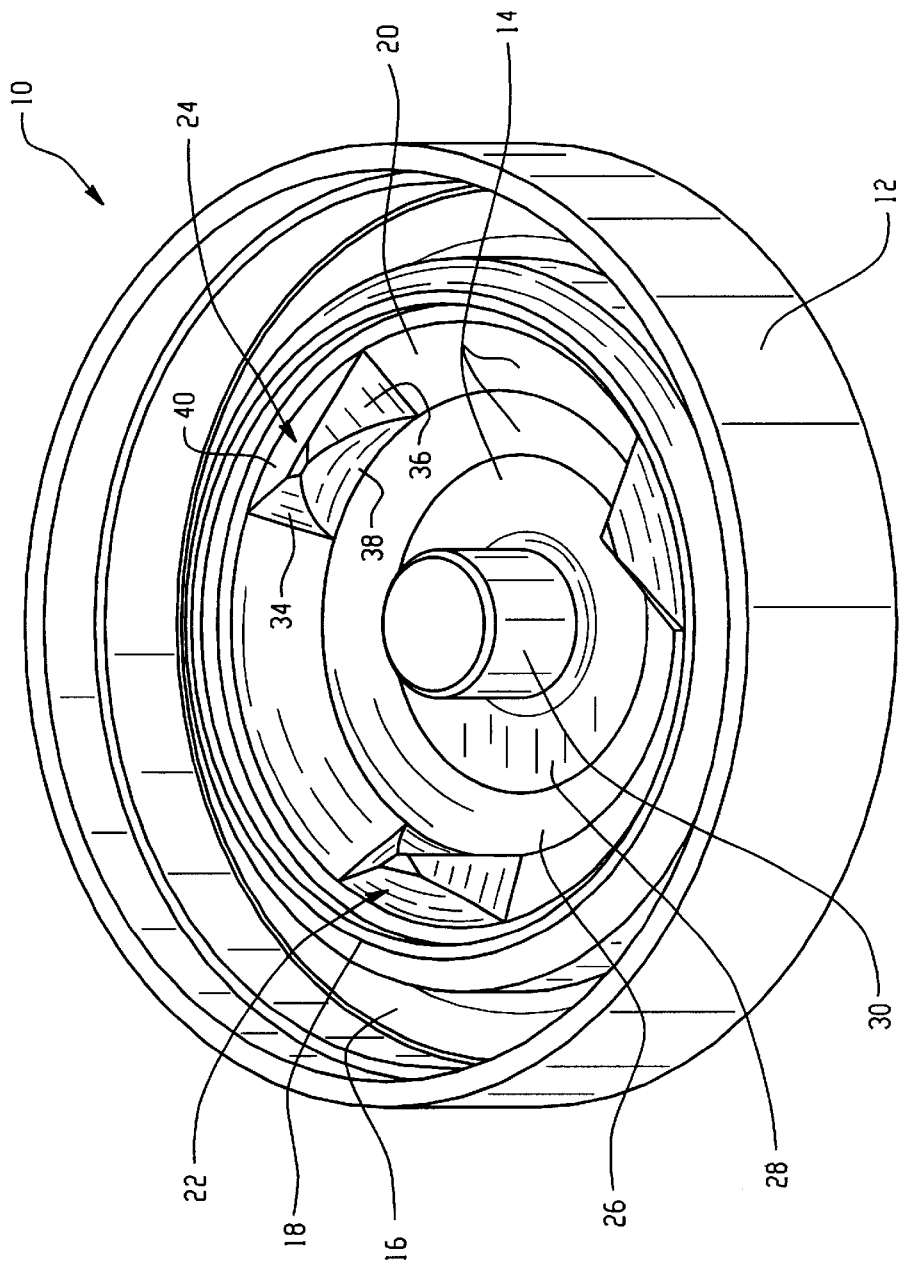
FIG. 1 is a perspective view of a nonvented seal member useful in a pressurized container of this invention.
Figure 2:
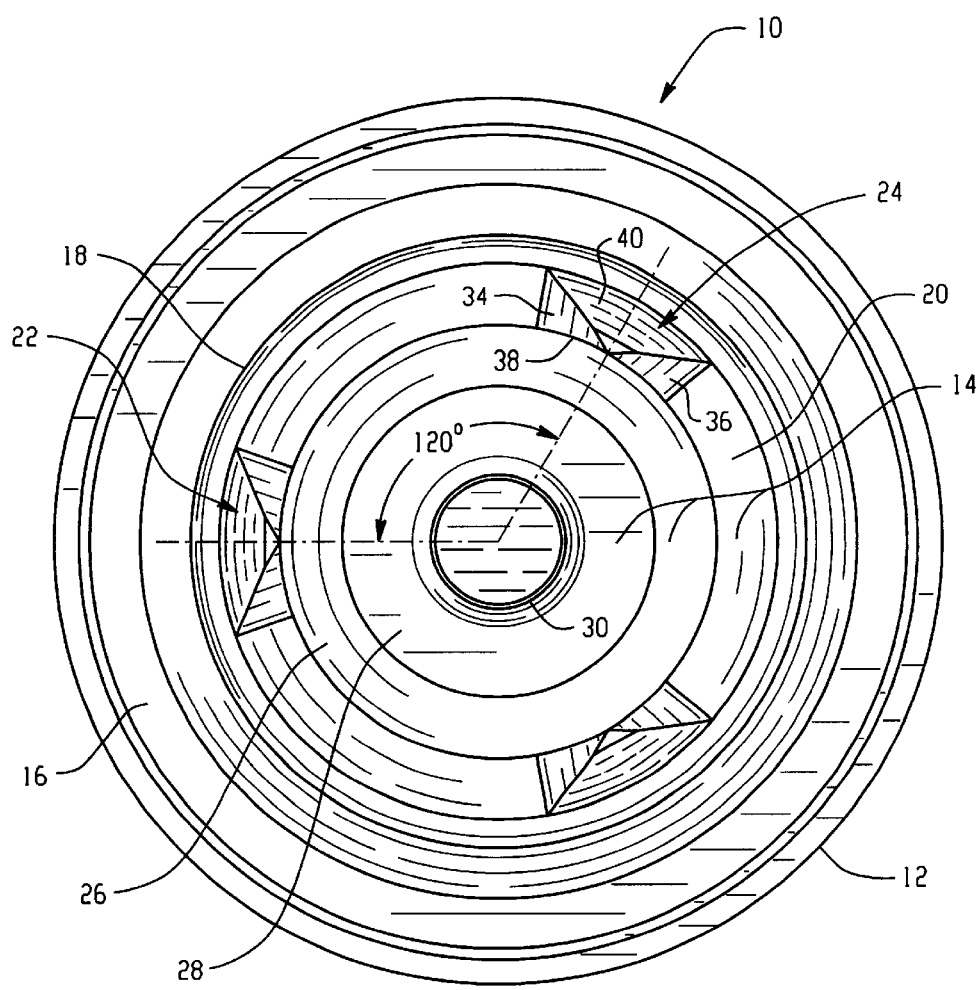
FIG. 2 is a top view of the seal member shown in FIG. 1.

FIGS. 1 to 6 show various views of seal members and pressurized containers comprising one of the seal members. Taken together, the figures and following description teach a skilled artisan how to practice the claimed invention. In one aspect, the subject invention is a pressurized container 50 with a vent assembly 52 that includes a seal member 10 and at least one cover 42. The vent assembly overlays an opening 54 in the wall 56 of the pressurized container and is secured to the container. The vent assembly functions as a pressure activated safety valve that relieves pressure within the container when the pressure exceeds a predetermined value. The seal member 10 is designed to rupture along a weakened line 32 in the seal member's diaphragm region 28. The torn diaphragm then responds to the gas venting from within the container by bending toward the cover 42. The torn diaphragm is prevented from contacting the cover by the existence of two or more protrusions, 22 and 24, that project from the top surface 14 of the seal member. The protrusions are positioned and shaped to define and maintain a gap between the torn diaphragm and cover thereby allowing gas from within the container to escape past the seal member. A hole 58 in the cover allows the gas to escape beyond the cover into the atmosphere surrounding the container. The invention will now be explained in greater detail.

Referring to the drawings and more particularly to FIG. 1, there is shown a perspective view of a seal member 10 suitable for use in a pressurized container, such as an electrochemical cell, of the present invention. The seal member is a generally disc-shaped unitary component with an outside diameter substantially greater than its thickness. The seal member includes several regions and/or features that enable the seal member to function as a rupturable valve in a pressurized container. The perimeter of seal member 10 is upstanding wall 12. The surface of wall 12 is generally perpendicular to the disc-shaped seal member's top surface 14 and bottom surface (not shown). Inwardly disposed from wall 12 is a first annularly shaped region 16 that abuts wall 12 and is concentric with the center of the seal member 10. Circular ridges 18 abut the first annularly shaped region. Juxtapose ridges 18 is an annularly shaped region 20 which is inclined toward the center of the seal member. At least two protrusions are located on the surface of region 20. First protrusion 22 and second protrusion 24 are located approximately 120° from one another. As will be explained later, the exact number, size, shape and location of the protrusions may be altered to accommodate seal design parameters such as the outside diameter of the seal body, the pressure at which the seal is designed to vent, the material from which the seal is made, etc. Located radially inwardly from circular region 20 is a second annularly shaped region 26 which separates region 20 from diaphragm region 28 that abuts extension 30. The thickness of region 28 is nonuniform. A groove 32 (shown in FIG. 3) in the bottom surface of region 28 creates a ring of thinned seal material that is concentric with the center of extension 30 which is concentric with the center of seal member 10. When seal member 10 ruptures in response to an increase in internal pressure, the seal member ruptures at groove 32 thereby at least partially separating the extension from the radially outer sections of seal member 10 such as the protrusions, 22 and 24, first annularly shaped region 16 and upstanding wall 12. Groove 32 could be located anywhere between the extension's circumferential surface and the junction of the second annularly shaped region 26 and diaphragm region 28.

FIG. 1 represents one embodiment of a seal member with protrusions located on the top surface of the seal member. While other embodiments are possible, certain design criteria need to be considered to insure the proper functioning of the seal member. First, the groove in the bottom surface of diaphragm region 28 should encircle extension 30 so that a circular tear is formed in the seal member when it vents. Preferably, the tear creates a 360° tear around the extension. However, a tear less than 360° but greater than 270° is functional. Second, there must be an unobstructed distance between the groove and any of the protrusions. As used herein, the term "unobstructed" means the lack of a physical element that would impede tearing of the seal member at groove 32. In the embodiment shown in FIG. 1, the second annularly shaped region 26 provides the unobstructed distance between the groove and the protrusions. Third, there must be at least two protrusions and the protrusions must be positioned, relative to each other, to insure the creation and maintenance of a gap between the torn edge of the diaphragm and the cover after the seal has ruptured. The gap occurs in the shortest distance between the protrustions. If the protrusions are too far apart, the torn edge of the diaphragm could contact and reseal against the cover's bottom surface. If only one protrusion is used, the torn diaphragm may reseal against the cover on either side of the protrusion. Therefore, the seal member must contain two or more protrusions. Fourth, the protrusions must not form a continuous or nearly continuous barrier around the tear in the diaphragm. Fifth, the centrally located extension must be tall enough to either directly or indirectly contact the cover that is positioned over the seal body's top surface.

The location of the protrusions can be changed to accommodate the number of protrusions. Two protrusions can be located as close as 20° to one another or as far apart as 180° from one another. The positions of the protrusions are determined by looking at the seal body's top surface, also known as a "top view," and then determining the angle formed by drawing straight lines from the center of each protrusion through the center of the extension. See FIG. 2. Suitable locations for the protrusions are 45° apart, 60° apart, 90° apart, 120° apart or 180° apart. Preferably, all of the protrusions are located the same distance from the center of the seal member. In a AA size battery, which measures approximately 14.5 mm in diameter and 50.5 mm in height, the seal member, prior to insertion in the battery's container, is 14.3 mm in diameter and, preferably, has three protrusions located 120° apart.

The shape of the protrusions is not critical provided the protrusion can function as a means for maintaining a gap between the cover and seal member after the seal member has ruptured. Protrusions with a generally rectangular shape, a cylindrical shape, a three sided pyramidal shape or a four sided pyramidal shape, as shown in FIG. 1, are feasible. Preferably, the protrusion is tapered from the base of the protrusion toward the end of the protrusion that is closest to the cover. The preferred shape for a protrusion is pyramidal. A pyramidal protrusion has a four-sided base, four approximately triangularly shaped sides that extend from the base toward a common apex which is the distal end of the protrusion. Protrusion 24, shown in FIG. 1, has a first side 34, a second side 36, a third side 38 and a fourth side 40. First side 34 and second side 36 are shaped identically to each other. Third side 38 and fourth side 40 are shaped differently from each other as well as the first side and the second side. The apex of the protrusion has been cropped to create a small, flat area where the protrusion will contact the cover after the diaphragm has ruptured. While FIG. 1 shows a seal member with three protrusions that are the same size and shape, a seal member could contain protrusions having different sizes and/or shapes. For example, a seal member having four protrusions spaced equally from each other could have two pyramidally shaped protrusions and two rectangularly shaped protrusions.

Figure 3:
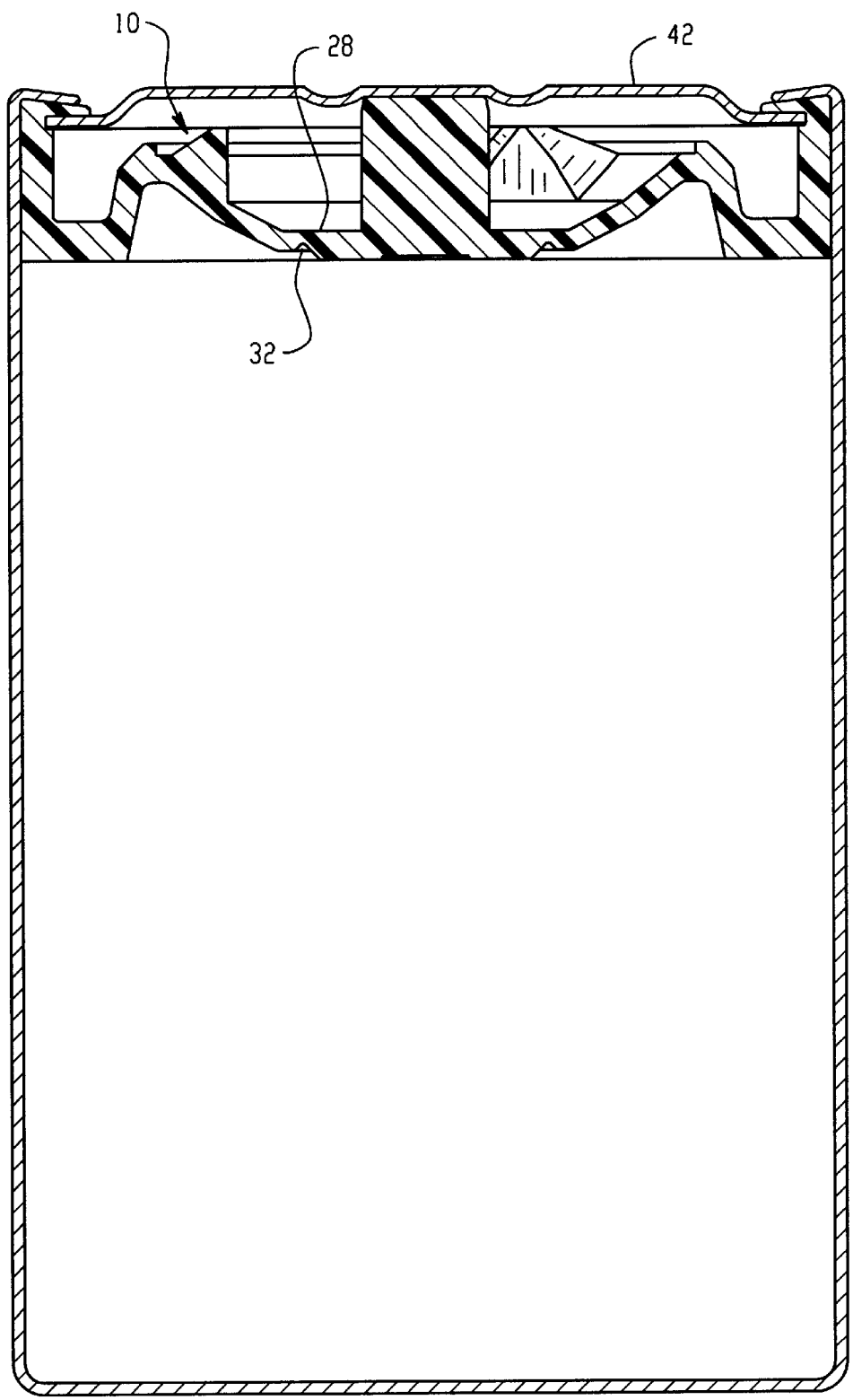
FIG. 3 is a longitudinal cross-sectional view of a pressurized container of this invention including the seal member shown in FIG. 1.
Figure 4:
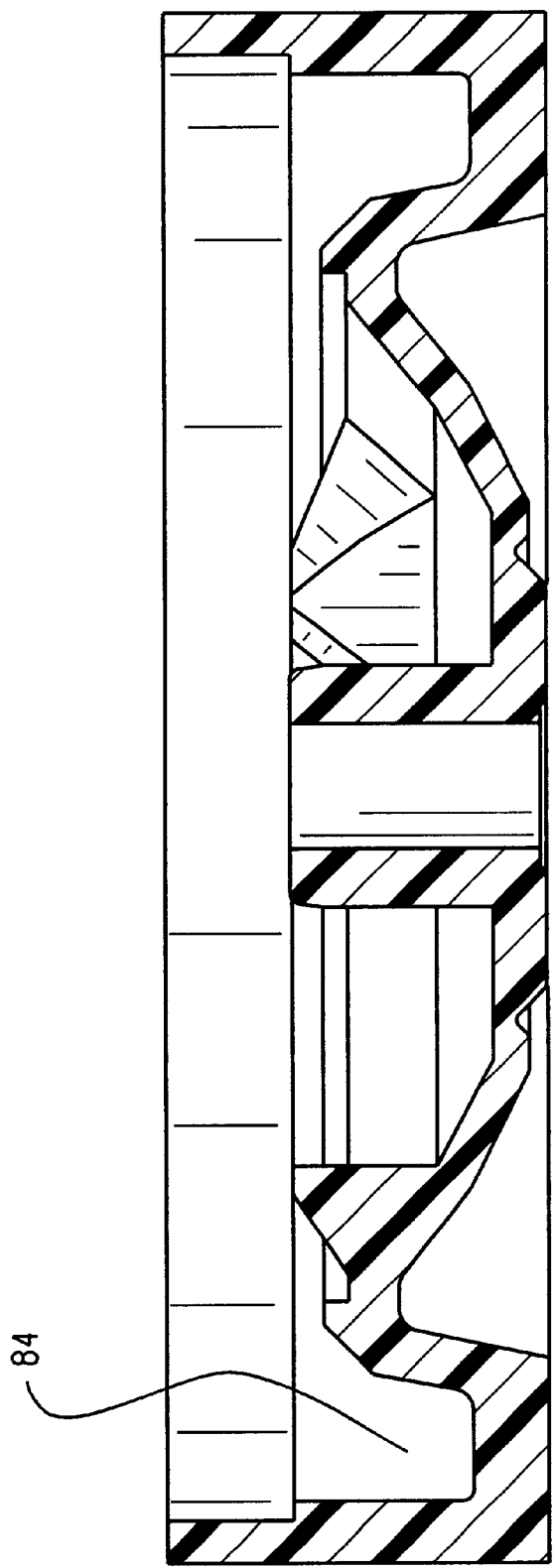
FIG. 4 is a cross-sectional view of a nonvented seal member useful in an electrochemical cell of this invention.

Extension 30 is located in the center of seal member 10. The function of extension 30 is to contact cover 42, as shown in FIG. 3, thereby creating a vent activation zone between diaphragm region 28 and cover 42. The vent activation zone is needed to provide room for the diaphragm to rip and move toward the cover as pressurized gas within the container escapes through the ruptured diaphragm. Preferably, the extension is cylindrically shaped so that it exerts uniform resistance against the diaphragm when the cell's internal pressure increases. The center of extension 30 may be solid, as shown in FIG. 1, or hollow as shown in FIG. 4. If the center of the extension is hollow, another structural element may be inserted into the tubularly shaped opening defined by the extension. A suitable structural element could be a current collector 44 as shown in FIG. 5, which depicts the cross section of an electrochemical cell.

The seal member may be made by injection molding a material such as nylon, polypropylene, polysulfone or impact modified polystyrenes into a cavity with the desired shape. After cooling, the seal member is removed from the mold as a unitary component comprising at least the protrusions, extension and ventable diaphragm region described above. By designing the seal member to contain the protrusions when the seal is molded, there is no need to use a separate component to prevent resealing of the vented seal member against the cover. Thus the cost and size of the vent assembly can be minimized.

Figure 5:
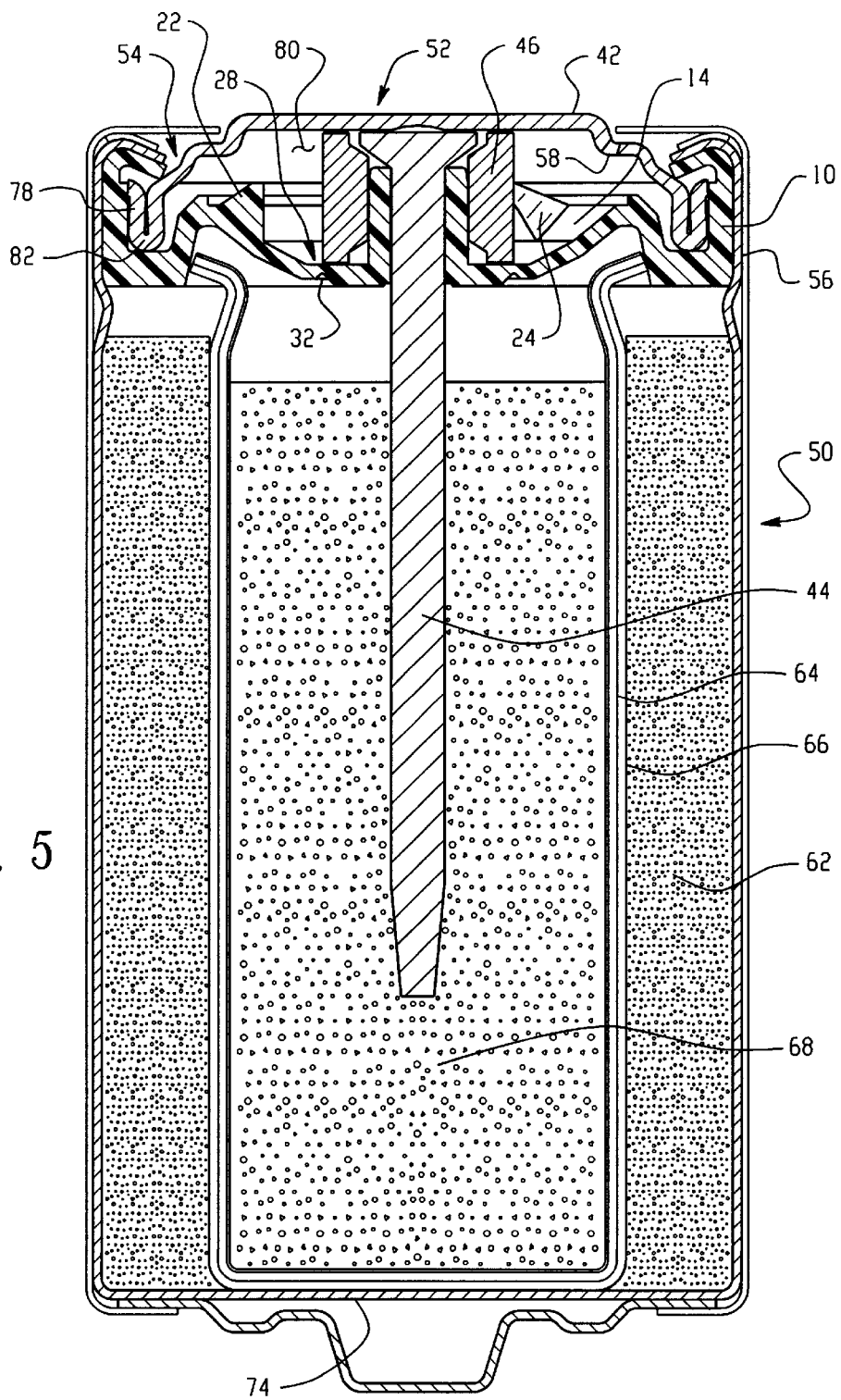
FIG. 5 is a longitudinal cross-sectional view of an electrochemical cell of this invention including the seal member shown in FIG. 4.

An optional component that may be used with seal body 10 is bushing 46 as shown in FIG. 5. The bushing is a hollow, tubularly shaped component that is designed to form an interference fit between the inside diameter of the bushing and the outside diameter of the extension. The thickness of the bushing's wall is selected so that the outer wall of the bushing aligns with groove 32 in diaphragm region 28. Aligning the bushing with the groove enables the bushing to facilitate rupturing of the seal member at the groove.

Located between the top surface 14 of seal member 10 and the environment surrounding the pressurized container is at least one rigid structural element commonly known as a terminal cover and also are referred to herein as a first cover. As shown in FIG. 5, the first cover is located within the opening 54 in container 50. If the first cover overlays the seal body such that the first cover would prevent gas in the pressurized container from escaping through the seal to the cell's environment, then the first cover must define at least one hole therethrough. In addition to contacting the seal member's extension, the perimeter of the cover may contact the seal member's upstanding wall which defines the perimeter of the seal member. Furthermore, a second cover may be placed between the first cover and the seal body. The second cover may be described as an inner cover when used in an electrochemical cell. The second cover may also define a second hole which is centrally located and through which a portion of the seal body's extension projects.

Terminal cover 42 is a generally cup-shaped component made of nickel-plated steel. The perimeter 78 of cover 42 is formed by rolling back the edge of the cover upon itself to create a double thickness of material that is approximately perpendicular to the central portion 80 of cover 42. Between the cover's central portion and its perimeter, the cover is contoured through a series of bends. The cover's central region 80 is recessed relative to the cover's rolled back edge 82. When cover 42 is inserted into the seal member's cover reception cavity 84 (see FIG. 4) and the vent assembly is crimped into the open end of container 50, the cover acts like a spring that compresses the seal body's upstanding wall 12 against the interior surface of container 50. By contouring the cover to possess a spring like characteristic, the vent assembly does not need to include a separate component to force the seal member's perimeter wall against the container.

Referring to FIG. 5, there is shown a cross-sectional view of an assembled electrochemical cell of this invention. Beginning with the exterior of the cell, the cell's components are the container 50, first electrode 62 positioned adjacent the interior surface of container 50, separator 64 contacting the interior surface 66 of first electrode 62, second electrode 68 disposed within the cavity defined by separator 64 and vent assembly 52 secured to container 50. Container 50 has an open end 54, a closed end 74 and a sidewall 56 therebetween. The closed end 74, sidewall 56 and vent assembly 52 define a cavity in which the cell's electrodes are housed.

Container 50 is made from nickel plated steel that has been formed into a cylindrical shape with one closed end and one open end. After the vent assembly has been inserted into the open end of the container, the assembly is secured to the container by crimping the container inwardly over the vent assembly and/or by adhesively securing the assembly to the container. The container may serve as a current collector for one of the cell's electrodes.

First electrode 62 is a mixture of manganese dioxide, graphite and an aqueous solution containing potassium hydroxide. The electrode is formed by disposing a quantity of the mixture into the open ended container and then using a ram to mold the mixture into a solid tubular shape that defines a cavity which is concentric with the sidewall of the container. Alternatively, the cathode may be formed by preforming a plurality of rings from the mixture comprising manganese dioxide and then inserting the rings into the container to form the tubularly shaped first electrode.

Second electrode 68 is a homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from Noveon of Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like. The second electrode may be manufactured by combining the ingredients described above into a ribbon blender or drum mixer and then working the mixture into a wet slurry.

Electrolyte suitable for use in a cell of this invention is a thirty-seven percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode. The method used to incorporate electrolyte into the cell is not critical provided the electrolyte is in contact with the first electrode 62, second electrode 68 and separator 64.

Separator 64 may be made from nonwoven fibers. One of the separator's functions is to provide a barrier at the interface of the first and second electrodes. The barrier must be electrically insulating and ionically permeable.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

What is claimed is:

1. A pressurized container comprising a gas and having a wall defining a circular opening through the wall and a vent assembly secured to the container's wall and sealing closed said opening, said assembly comprising:

a) a rigid cover, defining at least one hole therethrough thereby providing access through said cover, said cover located within the opening of said wall; and b) a flexible, disc-shaped, rupturable seal member secured to the container and overlaying the opening in said container, said seal member having an annularly shaped, rupturable diaphragm region concentrically aligned with the opening in said container's wall, said diaphragm located beneath the cover and between the seal member's perimeter, which contacts the container, and a centrally located tubularly shaped extension that projects from the seal member toward the cover and abuts the diaphragm region thereby forming a 360° interface where the extension and diaphragm contact one another, said rupturable diaphragm region having a top surface, located on the side of the seal member closest to the cover, and at least two protrusions located on the diaphragm's top surface, said protrusions located at a distance from the interface of the diaphragm and extension thereby insuring that an annular portion of the rupturable diaphragm located adjacent the extension remains unobstructed by the protrusions, said protrusions positioned to contact said cover in response to a pressure build up within the container causing the separation of said diaphragm from said extension about the 360° interface, said protrusions defining and maintaining a gap, after the seal member has ruptured, between the diaphragm and the cover thereby enabling the pressure within the container to be reduced as gas within the container escapes through the ruptured seal member, then through the gap between the seal member and cover, and then through said hole in said cover.

2. The pressurized container of claim 1, wherein the centers of said protrusions are no more than 120° apart when measured from the center of said seal member.

3. The pressurized container of claim 1, wherein the centers of said protrusions are no more than 90° apart when measured from the center of said seal member.

4. The pressurized container of claim 1, wherein the centers of said protrusions are no more than 45° apart when measured from the center of said seal member.

5. The pressurized container of claim 1, wherein at least one of said protrusions comprises a base, which abuts the seal member's top surface, and a distal end located on an end of the protrusion opposite said base, said protrusion tapered to provide a wide base and a narrow distal end.

6. The pressurized container of claim 5, wherein said protrusion has at least three sides which are tapered toward a common apex.

7. The pressurized container of claim 1, wherein said gap is located in the shortest distance between adjacent protrusions.

8. The pressurized container of claim 1, wherein said seal member comprises at least three protrusions.

9. The pressurized container of claim 1, wherein said seal member comprises at least four protrusions.

10. The pressurized container of claim 9, wherein said protrusion comprises a first side, a second side, a third side and a fourth side which are all tapered toward a common apex, said first side and said second side are shaped identically to each other, and said third side and said fourth side are shaped differently from each other, said first side and said second side.

11. The pressurized container of claim 1 wherein the separation of said diaphragm from said extension creates at least a 270° tear in said diaphragm.

12. The pressurized container of claim 1, wherein said assembly comprises a second rigid cover.

13. The pressurized container of claim 12 wherein one of said covers comprises at least two holes therethrough.

14. The pressurized container of claim 13 wherein one of said holes is located in the center of said cover.

15. The pressurized container of claim 1, wherein said seal member is an integrally molded elastomeric component.

16. The pressurized container of claim 15, wherein said seal member is made from a material selected from the group consisting of nylon, polypropylene, polysulfone and impact modified polystyrenes.

17. The pressurized container of claim 1, wherein said container comprises a first electrode in physical contact with said container, a second electrode in contact with an electrically conducting member that extends through said seal member's extension, a separator located between said first electrode and said second electrode and an electrolyte contacting said electrodes.

18. The pressurized container of claim 17, wherein said second electrode generates hydrogen gas when an electrically conductive path is established between said first electrode and said second electrode.

19. A pressurized container having a wall defining an opening and a vent assembly secured to the opening in the container, said assembly comprising:

a) a rigid cover located within the opening; and b) a flexible, rupturable seal member secured to the opening in the container and positioned beneath the cover, said seal member comprising means for maintaining a gap between the cover and seal member after the seal member has ruptured around a centrally located portion of the seal member in response to an increase in the container's pressure, said means for maintaining a gap comprises two or more protrusions located on a surface of the seal member that is closest to the cover.

20. The pressurized container of claim 19 wherein said protrusions are located an equal distance from the center of the seal member.

21. The pressurized container of claim 19 wherein said protrusions are tapered from the seal member toward the cover.

22. The pressurized container of claim 19 wherein said cover defines at least one opening therethrough.

23. The pressurized container of claim 19 wherein said means for maintaining a gap comprises an extension located at the center of said seal member, said extension contacts said cover.

24. The pressurized container of claim 23 wherein said means for maintaining a gap comprises an unobstructed annular section of the seal member located between said extension and said protrusions.

25. The pressurized container of claim 19 wherein said container further comprises a first electrode in physical contact with said container, a second electrode in contact with an electrically conducting member that extends through said seal member, a separator located between said first electrode and said second electrode and an electrolyte contacting said electrodes.

* * * * *